US005594923A

United States Patent [19]

Inoue et al.

[11] Patent Number: 5,594,923

[45] Date of Patent: Jan. 14, 1997

[54] DIRECT MEMORY ACCESS CONTROLLER COMPRISING A MULTI-WORD DATA REGISTER FOR HIGH SPEED CONTINUOUS DATA TRANSFER

[75] Inventors: Satoshi Inoue; Takashi Miyamori, both of Tokyo, Japan

[73] Assignee: Kabushiki Kaisha Toshiba, Kawasaki, Japan

[21] Appl. No.: 551,700

[22] Filed: Nov. 1, 1995

Related U.S. Application Data

[63] Continuation of Ser. No. 994,710, Dec. 22, 1992, abandoned.

[30] Foreign Application Priority Data

Dec. 24, 1991 [JP] Japan .................................... 3-341222

[51] Int. Cl.$^{6}$ ...................................................... G06F 13/00

[52] U.S. Cl. ......................... 395/842; 395/427; 395/841; 395/853; 395/872; 395/886; 364/DIG. 1

[58] Field of Search .................................... 395/427, 841, 395/842, 853, 872, 886

[56] References Cited

U.S. PATENT DOCUMENTS

| | | | |
|---|---|---|---|
| 4,479,179 | 10/1984 | Dinwiddie, Jr. | 395/275 |
| 4,782,439 | 11/1988 | Borkar et al. | 395/425 |
| 4,797,809 | 1/1989 | Sato et al. | 395/425 |
| 5,014,186 | 5/1991 | Chisholm | 395/275 |
| 5,077,664 | 12/1991 | Taniai et al. | 395/425 |
| 5,276,684 | 1/1994 | Pearson | 370/94.1 |

*Primary Examiner*—Frank J. Asta
*Attorney, Agent, or Firm*—Foley & Lardner

[57] ABSTRACT

A data transfer apparatus includes a register file, a control means, and an operation defining and holding means to execute a DMA transfer of a series of data between devices at a high speed. The data, which are continuously read out from said devices, are once stored in said register file, according to the control by said control means and the information stored in said operation defining register. The data stored in said register file are then continuously transferred into the destination device. As a result, a high speed transfer of a series of data is executed between devices.

8 Claims, 12 Drawing Sheets

FIG.4

| DATA REGISTER TO BE SELECTED | DRS0# | DRS1# |
|---|---|---|
| DTR0 | H | H |
| DTR1 | L | H |
| DTR2 | H | L |
| DTR3 | L | L |

FIG.5

| STP, DTP IN ODR | DPS IN ODR | TBC[2,3] | DRBC0# | DRBC1# | DRBC2# | DRBC3# |
|---|---|---|---|---|---|---|
| 10(I/O) | 10(FOUR BYTES) | 00 | L | L | L | L |
| | 01 (TWO BYTES) | 00 | L | L | H | H |
| | | 10 | H | H | L | L |
| | 00 (ONE BYTE) | 00 | L | H | H | H |
| | | 01 | H | L | H | H |
| | | 10 | H | H | L | H |
| | | 11 | H | H | H | L |
| 00, 01 MEMORY | — | 00 | L | L | L | L |

FIG.7

| TBC AFTER DATA UPDATE | RW IN SR | STP | DTP | DEVICE TO BE ACCESSED NEXT |
|---|---|---|---|---|
| = 0000 | 0 (READ) | — | 00 | MEMORY |
| | | — | 01 | MEMORY |
| | | — | 10 | I/0 |
| = 0000 | 1(WRITE) | 00 | — | MEMORY |
| | | 01 | — | MEMORY |
| | | 10 | — | I/0 |
| ≠ 0000 | 0(READ) | 00 | — | MEMORY |
| | | 01 | — | MEMORY |
| | | 10 | — | I/0 |
| ≠ 0000 | 1(WRITE) | — | 00 | MEMORY |
| | | — | 01 | MEMORY |
| | | — | 10 | I/0 |

— : ARBITRARY

FIG. 8

| STP, DTP IN ODR | DPS IN ODR | TBC IN ODR | TBC BEFORE DATA UPDATE |
|---|---|---|---|
| 10 (I/O) | 00 (ONE WORD) | 00 (ONE BYTE) | 0011 |
| | | 01 (TWO BYTES) | 0010 |
| | | 10 (FOUR BYTES) | 0000 |
| | 01 (TWO WORDS) | 00 (ONE BYTE) | 0111 |
| | | 01 (TWO BYTES) | 0110 |
| | | 10 (FOUR BYTES) | 0100 |
| | 10 (FOUR WORDS) | 00 (ONE BYTE) | 1111 |
| | | 01 (TWO BYTES) | 1110 |
| | | 10 (FOUR BYTES) | 1100 |
| 00, 01 (MEMORY) | 00 (ONE WORD) | — | 0000 |
| | 01 (FOUR WORDS) | — | 0100 |
| | 10 (FOUR WORDS) | — | 1100 |

DIRECT MEMORY ACCESS CONTROLLER COMPRISING A MULTI-WORD DATA REGISTER FOR HIGH SPEED CONTINUOUS DATA TRANSFER

This application is a continuation of application Ser. No. 07/994,710, filed Dec. 22, 1992, now abandoned.

BACKGROUND OF THE INVENTION

1. Field of the Invention

This invention relates to a data transfer apparatus which transfers data between a memory and an external I/O device, or between memories. In particular, this invention relates to a data transfer apparatus which transfers a series of data, including a plurality of words, at a high speed.

2. Description of the Prior Art

An example of a data transfer apparatus according to the prior art of the present invention is shown in FIG. 11. The apparatus shown in this figure is a DMA controller (Direct Memory Access Controller) which is used instead of a processor to control a data transfer.

As shown in FIG. 11, the prior art DMA controller 50 is comprised of the following: a data register DTR; a destination address register DAR; a source address register SAR; a byte count register BCR; an operation defining register ODR; a subtracter 53; adders 54 and 55; and a DMA control circuit 52.

DMA controller 50 executes a data transfer between a memory and an external I/O device, or between memories. In a practical way of data transfer, DMA controller 50 once stores transfer data into internal data register DTR. In this case, first, DMA controller 50 outputs the address of a device, from which data are transferred, onto address bus ABUS. Then, DMA controller 50 stores transfer data into internal data register DTR. These processes are referred to a read bus cycle. Next, DMA controller 50 executes a write bus cycle. In other words, DMA controller 50 outputs the address of a destination device onto address bus ABUS, and then, outputs the transfer data, stored in data register DTR, onto data bus DBUS so as to execute a data transfer.

In the prior art data transfer apparatus mentioned above, data register DTR in controller 50 has only one word capacity. Therefore, the memory access is carried out in a one word unit at a maximum.

Data register DTR is controlled by means of read signal RD#, write signal WR#, and timing signal LTC#, which are output from DMA control circuit 52. Read signal RD# becomes active when the transfer data are stored into the internal register, and write signal WR# becomes active when the transfer data are output from the internal register. Timing signal LTC# determines the timing for storing the transfer data into data register DTR. In those signals, ones having # show that they are negative logic signals, so that they become active when their states are low, that is, in level L.

FIG. 12 shows the transition of bus states. In this figure, state Ti means that DMA controller 50 is in an idle state instead of a bus master state. Also, state Ta means that it is the starting cycle of a DMA data transfer, and state Td means that it is a data transfer cycle of the DMA data transfer. One bus cycle is comprised of one state Ta and more than one state Tds.

Next, the operation to transfer four words from a memory to an external I/O device in one word (32 bits) unit will be described with referring to the timing chart shown in FIG. 13.

When a transfer request arises out of DMA controller 50 or the external I/O device, DMA controller 50 acquires a bus utility right from a processor and changes its state from state Ti to state Ta, thus starting a memory read cycle. Once state Ta has started, the address of the device from which data are transferred, (that is, the values stored in source address register SAR), is output onto address bus ABUS (signals A00~A29, and signals BC0# ~BC3#). At the same time, read-write signal R/W# is set at level H, and bus start signal BS# is set at level L. Also, address strobe signal AS# is set at level L at the falling clock signal CLKin of state Ta.

In the following state Td, bus start signal BS# is set at level H and data strobe signal DS# is set at level L at the first rising of clock signal CLK. Also, data transfer end signal DC# is sampled at the falling of clock signal CLK in state Td. In this case, DMA control circuit 52 causes read signal RD# to change to level L, and write signal WR# to change to level H, in order to store the transfer data, which have been carried by data bus DBUS (signals D00 ~D31), into data register DTR.

If data transfer end signal DC# being sampled is at level L, address strobe signal AS# and data strobe signal DS# are caused to change to level H. Adder 54, then, increases the number of source address register SAR by the byte number of transfer data (in this case, four bytes), in order to complete the memory read cycle. On the other hand, data transfer end signal DC# being sampled is at level H, this cycle should be considered to be a wait cycle, and so, state Td continues.

Once the memory read cycle has been completed, an I/O write cycle begins. When state Ta is started, the address of the device into which data are transferred, (that is, the values in destination address register DAR) is output on address bus ABUS. Also, read-write signal R/W# and DMA transfer response signal DACK# are set at level L. Address strobe signal AS# is set at level L at the falling of clock signal CLK in state Ta.

At the first rising of clock signal CLK in the next state Td, bus start signal BS# is set at level H and data strobe signal DS# is set at level L. Also, DMA control circuit 52 causes read signal RD# to change to level H and write signal WR# to change to level L in order to output the transfer data, which have been stored in data register DTR, onto data bus DBUS.

The sampling of data transfer end signal DC# is carried out at the falling of clock signal CLK in state Td. If data transfer end signal DC# being sampled is in level L, address strobe signal AS# and data strobe signal DS# are set at level H. At the same time, subtracter 53 decreases the values in byte count register BCR by the byte number of transfer data (in this case, four bytes) in order to complete the I/O write cycle. On the other hand, if data transfer end signal DC# being sampled is in level H, the present cycle is considered to be a wait cycle to continue state Td. If another transfer request is generated at the end of said I/O write cycle, state Ta starts next, allowing DMA controller 50 to repeat the data transfer described above. If no transfer request is generated, DMA controller 50 relinquishes the bus utility right and turns into state Ti.

Accordingly, in order to transfer one word data, the prior art DMA controller 50 requires at least four clocks, two of which are for state Ta and Td in one read bus cycle and the rest of which are for state Ta and Td in one write bus cycle. So, it requires 4×n clocks to transfer n word data.

As mentioned above, the prior art data transfer apparatus has a data register which has only one word capacity. As a result, the apparatus carries out a memory access only in a one word unit, at a maximum. This fact is disadvantageous in improving the speed of DMA data transfer.

For example, a dynamic RAM, which is a kind of memory, is accessible not only by a conventional access mode but by a high speed access mode, such as a page mode, as well. When an address is given in the high speed access mode, a series of data can be derived from the address being given. Therefore, the following data access can be executed at a high speed.

However, the prior art data transfer apparatus cannot make use of the high speed access mode of the memory mentioned above, because the apparatus does not have a function to deal with a series of data, having a plurality of words, at a time.

SUMMARY OF THE INVENTION

This invention is made to overcome the above mentioned problems of the prior art apparatus.

Therefore, one objective of the present invention is to provide a data transfer apparatus which is capable of transferring multi-word data at a high speed.

Another objective of the present invention is to provide a data transfer apparatus which is capable of transferring multi-word data in an arbitrary unit at a high speed.

The first feature of the present invention provides a data transfer apparatus 1 having a register file 6 as shown in FIG. 1. This register file 6 is provided in order to store multi-word data which have been continuously read from external devices connected with the present apparatus 1 through bus BUS. As a result, apparatus 1 executes a DMA transfer in which one word or multi-word data can be transferred between said external devices at a high speed.

The second feature of the present invention provides a data transfer apparatus 1 having register file 6 and a control means 7. This control means 7 is provided in order to control the data reading or data writing of said register file 6, the data which are obtained from said external devices through said bus BUS. As a result, apparatus 1 executes a DMA transfer in which one word or multi-word data can be transferred between said external devices at a time with a high speed.

The third feature of the present invention provides a data transfer apparatus 1 which includes an operation defining and holding means 8 in addition to said register file 6 and control means 7. This operation defining and holding means 8 holds the following: the type of a device from which data are transferred (referred to a source device below); the type of another device into which data are transferred (referred to a destination device below); and the transfer unit for the transfer of multi-word data. In addition, said control means 7 is comprised of the following: a state holding means 11 for storing bus access states of the present apparatus 1; and a means 12 for counting byte numbers of the data stored in said register file 6.

In the fourth feature of the present invention, said state holding means 11 stores different kinds of bus access states as follows: a first state Ta in which addresses of said external devices accessed by the present apparatus 1 are output; and a second state Td in which a data transfer for one word is executed. Further, said control means 7 transfers multi-word data by executing said first state Ta once and then executing said second state Td several times.

In the fifth feature of the present invention, said control means 7 determines the next state to change according to informations held in said operation defining and holding means 8, state holding means 11, and counting means 12.

According to said first and second feature of the present invention, as shown in FIG. 1, a transfer of multi-word data is executed at a time between external devices, for example, between a memory 3 and another memory 4. In this case, apparatus 1 accesses one of the two memories to continuously read out a plurality of words, and stores the words into register file 6. Then, apparatus 1 accesses the other memory in order to transfer the multi-word data stored in register file 6 into the memory.

As a result, apparatus 1 can continuously transfer multi-word data at a time. Therefore, apparatus 1 makes use of a high speed access mode, such as the page mode, in order to transfer data into a memory, which is accessible by said mode, at a high speed.

According to said third, fourth, and fifth features of the present invention, as shown in FIG. 1, a transfer of multi-word data is also executed at a time between external devices, such as memory 3 and memory 4. In this case, processor 2 demands a data transfer and designates the type of a source device, the type of a destination device, and the transfer unit for the multi-word data transfer. These informations are stored into operation defining and holding means 8. At first, data transfer apparatus 1 sets state holding means 11 to be at the first state Ta, and outputs the address of the source memory to be accessed. Next, apparatus 1 sets means 11 to be the second state Td to store one word data into register file 6. At this time, means 12 counts up the byte number of one word data. The operation in this second state is continuously repeated until several words have been written into register file 6. After the completion of the data writing into register file 6, apparatus 1 sets state holding means 11 to be at the first state Ta, and outputs the address of the destination memory to be accessed. Then, state holding means 11 turns into the second state Td to read out the data of one word from register file 6 and sends them into the destination memory through bus BUS. At this time, means 12 counts down the byte number of data by one word. The operation in this second state is continuously repeated until the value in counting means 12 comes into 0. Thus, the data reading and data writing of register file 6 is controlled by counting means 12. Control means 7 determines the next transition state of apparatus 1 according to the values stored in operation defining and holding means 8, state holding means 11, and counting means 12, and executes the next state transition.

As a result, apparatus 1 can transfer data including a plurality of words at a time, thus providing a high speed data transfer. Also, the next transition state is determined according the stored values in means 8, means 11, and means 12, thus facilitating the control of complicated state transition. Further, the word number of data to be transferred at a high speed can be set arbitrarily by programing, thus enabling to transfer data including a plurality of words in an arbitrary unit.

These and other objectives, features, and advantages of the present invention will be more apparent from the following detailed description of preferred embodiments, taken in conjunction with the accompanying drawings.

BRIEF DESCRIPTION OF THE DRAWINGS

FIG. 4 is a table showing the relation between the states of data register selective signals DRS0# and DRS1#and the data registers selected by these signals;

FIG. 5 is the truth table of data register byte control signals DRBC0#~DRBC3#;

FIG. 7 is a table showing the relation between the device to be accessed next and the values in data transfer byte count register TBC, the RW bit of bus state register SR, and the STP and DTP fields of operation defining register ODR;

FIG. 8 is a table explaining the case where the value in data transfer byte count register TBC after a data update becomes 0000;

DETAILED DESCRIPTION OF PREFERRED EMBODIMENTS

Figure 1:
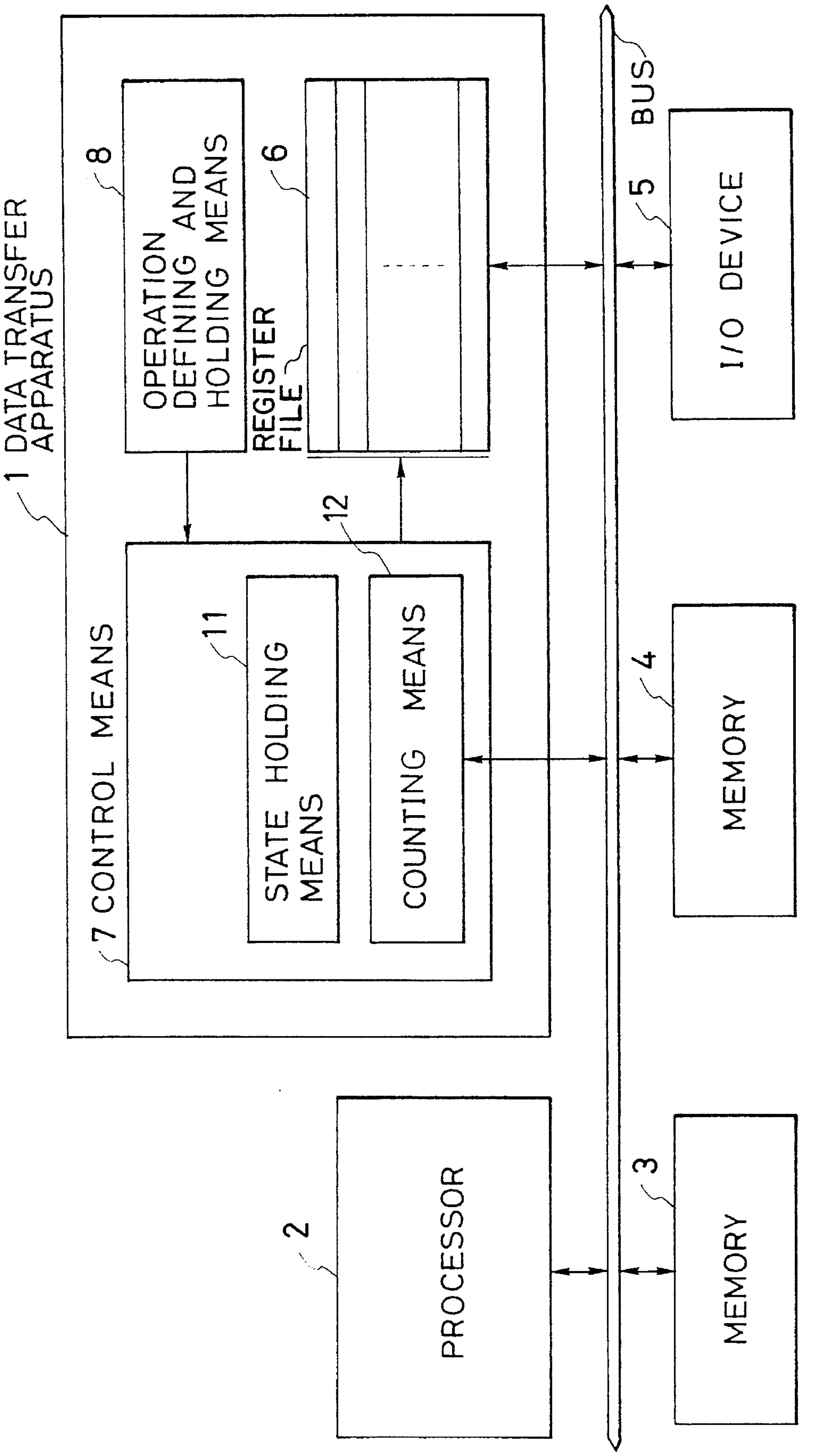
FIG. 1 is a view showing the principle of the present invention.
Figure 2:
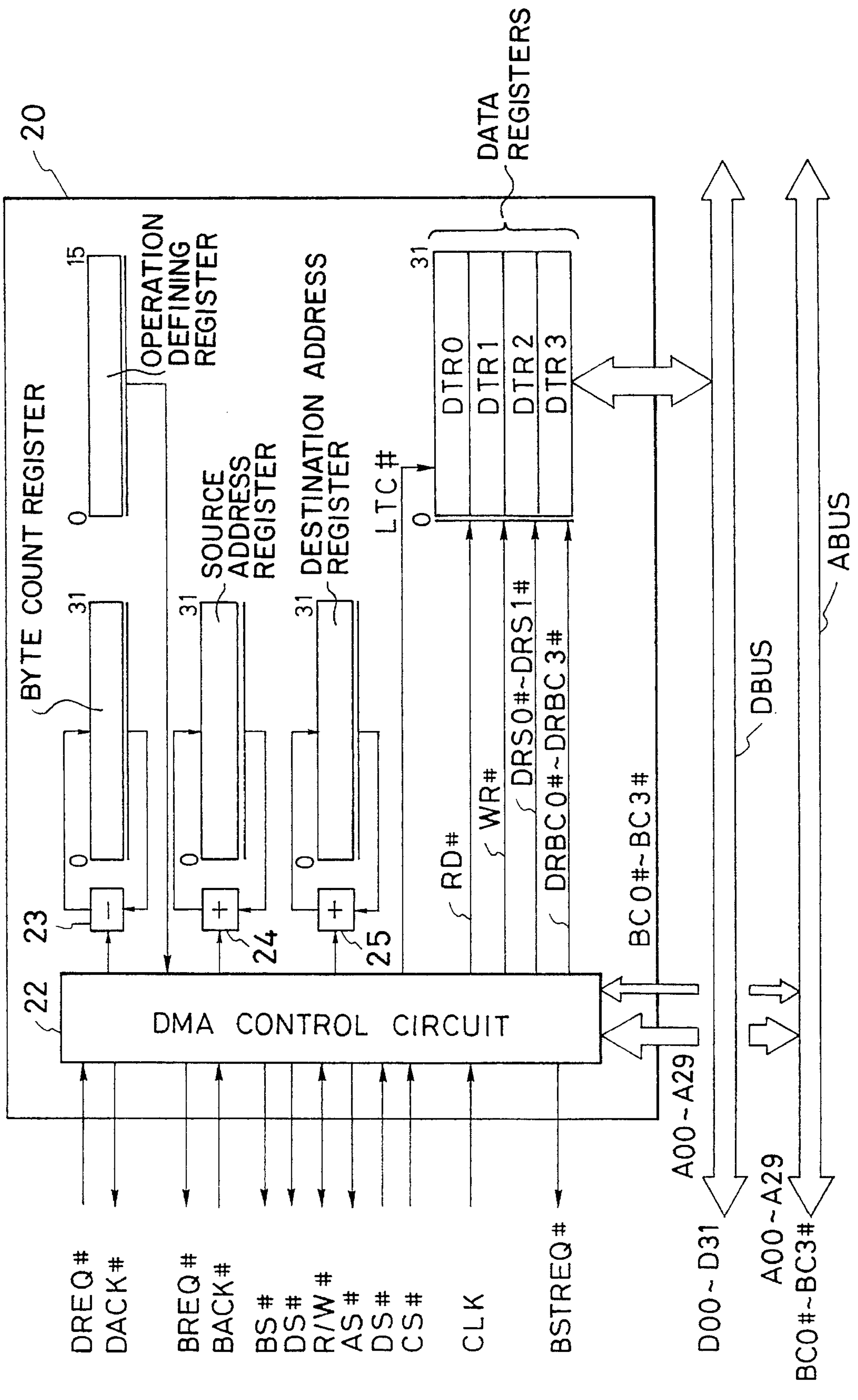
FIG. 2 is a view showing the structure of a data transfer apparatus according to one embodiment of the present invention.
Figure 11:
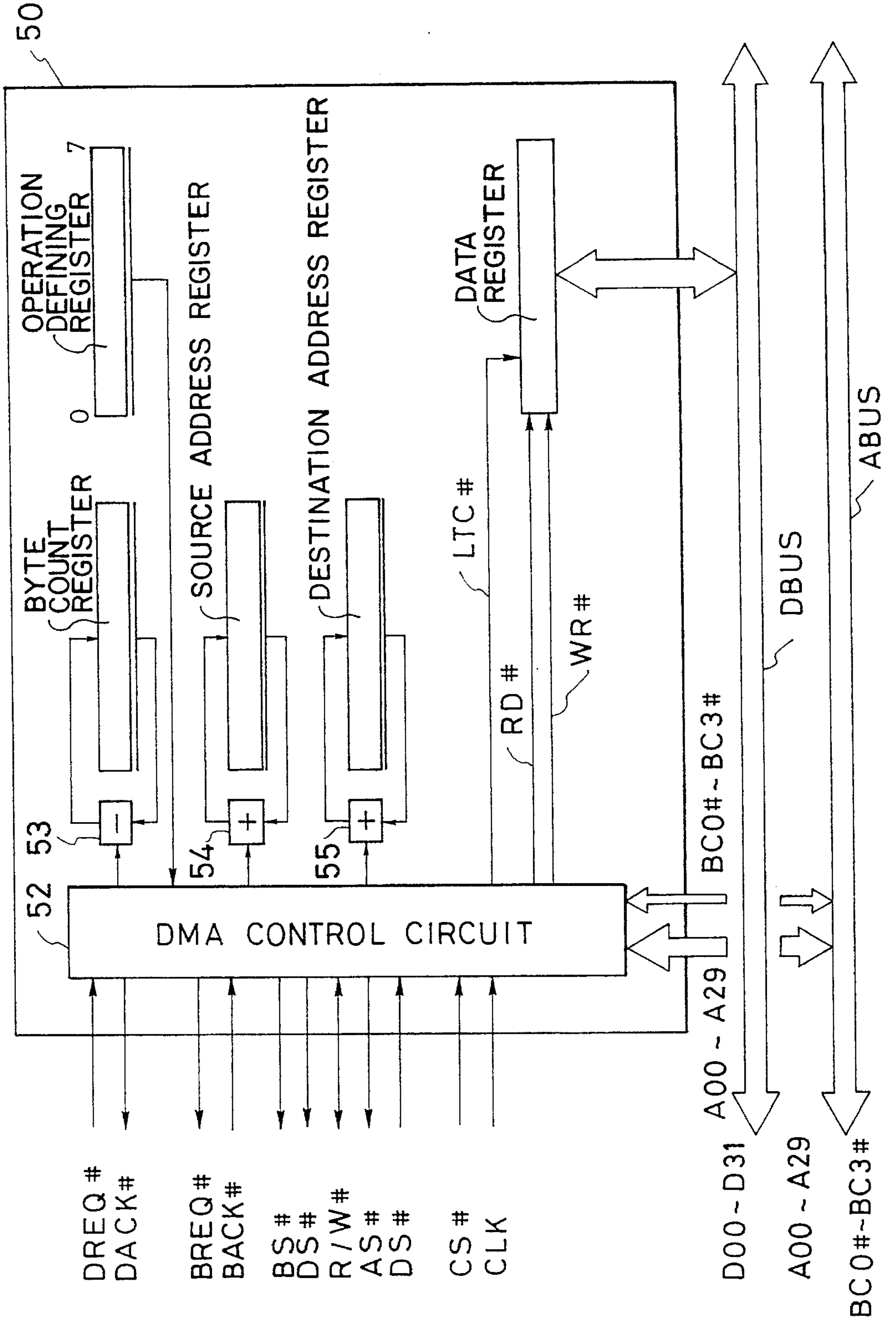
FIG. 11 is a view showing the structure of a prior art data transfer apparatus.
Figure 12:
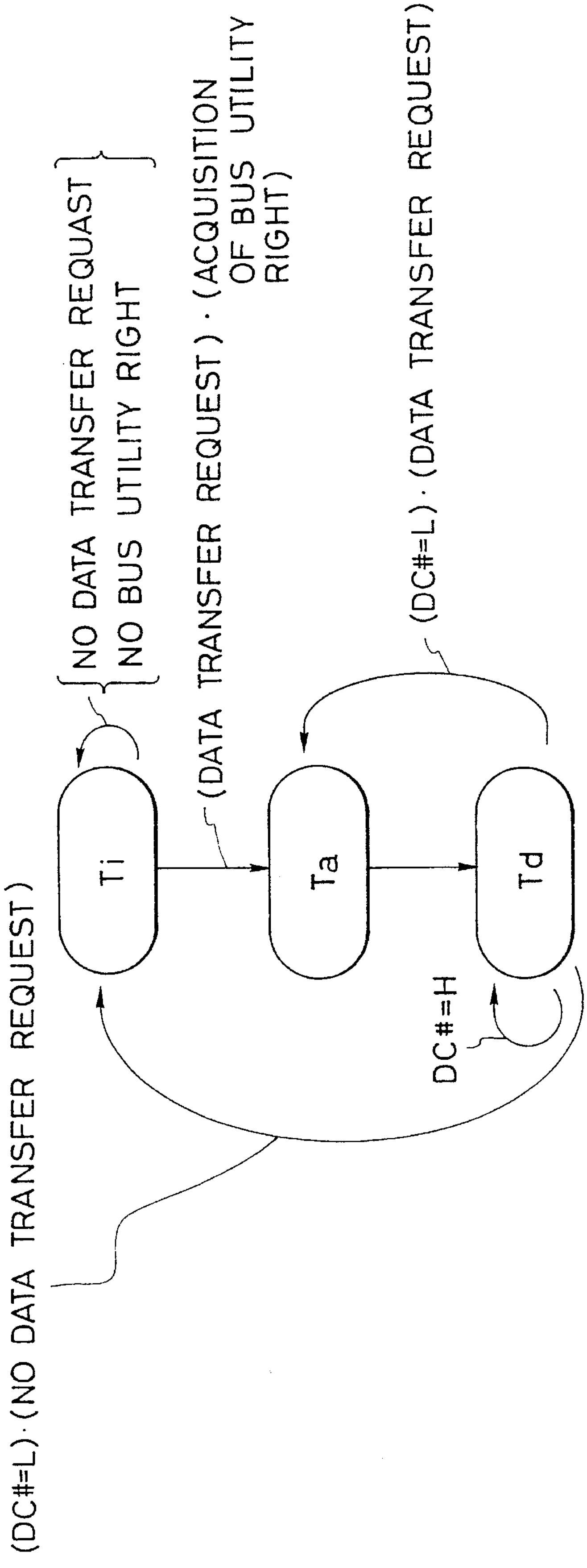
FIG. 12 is a view showing the state transition in the prior art data transfer apparatus.

FIG. 2 shows the structure of a DMA controller according to one embodiment of the present invention. In this figure, the same numbers as those shown in FIG. 11 indicate the same structure members with each other.

As shown in FIG. 2, a DMA controller 20 according to this embodiment is comprised of the following: a DMA control circuit 22; a subtracter 23; adders 24 and 25; and a plurality of internal registers. This embodiment is designed to control a DMA transfer using one channel, so that the internal registers include an operation defining register ODR, a byte count register BCR, a source address register SAR, a destination address register DAR, and a plurality of data registers DTR0~DTR3.

DMA controller 20 has interface means for external signals described below.

DMA transfer request signal DREQ# is output from an external I/O device in order to request a DMA transfer. This signal is set active by the I/O device when it requests a DMA transfer against DMA controller 20. DMA transfer acknowledge signal DACK# shows that a DMA transfer is being operated in response to the transfer request from the I/O device.

Bus request signal BREQ# is to request a bus utility right against a processor. On the contrary, bus acknowledge signal BACK# is to respond to the request of bus utility right which is carried out by bus request signal BREQ#. Thus, when response signal BACK# is set active, DMA controller 20 comes into a bus master state to carry out DMA transfer cycles.

Address bus signals A00~A29 show the values of upper 30 bits of an address which is accessed in a DMA transfer. Byte control signals BC0#~BC3# show effective bytes among data bus signals D00~D31. In this embodiment, four byte control signals BC0#~BC3# are provided because data bus signals D00~D31 have 32 bits. In fact, signal BC0# indicates that data bus signals D00~D07 are effective. In the same way, signal BC1#, BC2#, or BC3# indicates respectively that data bus signals D08~D15, D16~D23, or D24~D31 are effective. These byte control signals BC0#~BC3# make up address bus ABUS with address bus signals A00~A29. Address strobe signal AS#indicates that address information outputs are effective when DMA controller 20 is in a bus master state.

Data bus signals D00~D31 are used to exchange data with memories and I/O devices. These signals make up data bus DBUS. Data strobe signal DS# indicates that the data being managed are effective.

Bus start signal BS# indicates a beginning of bus cycles, and so, it stays active during the first clock of the bus cycles. Read-write signal R/W# indicates whether the bus cycle is in a read bus cycle or in a write bus cycle. Data transfer end signal DC# indicates the end of bus cycles. When this signal is set active by external circuits, such as the memories and external I/O devices which have been accessed during the bus cycles, DMA controller 20 stops the bus cycles.

Chip select signal CS# is set to be active from outside when the processor accesses the internal registers in DMA controller 20. High speed access request signal BSTREQ# requires a memory to operate in a high speed access mode.

Figure 3A:
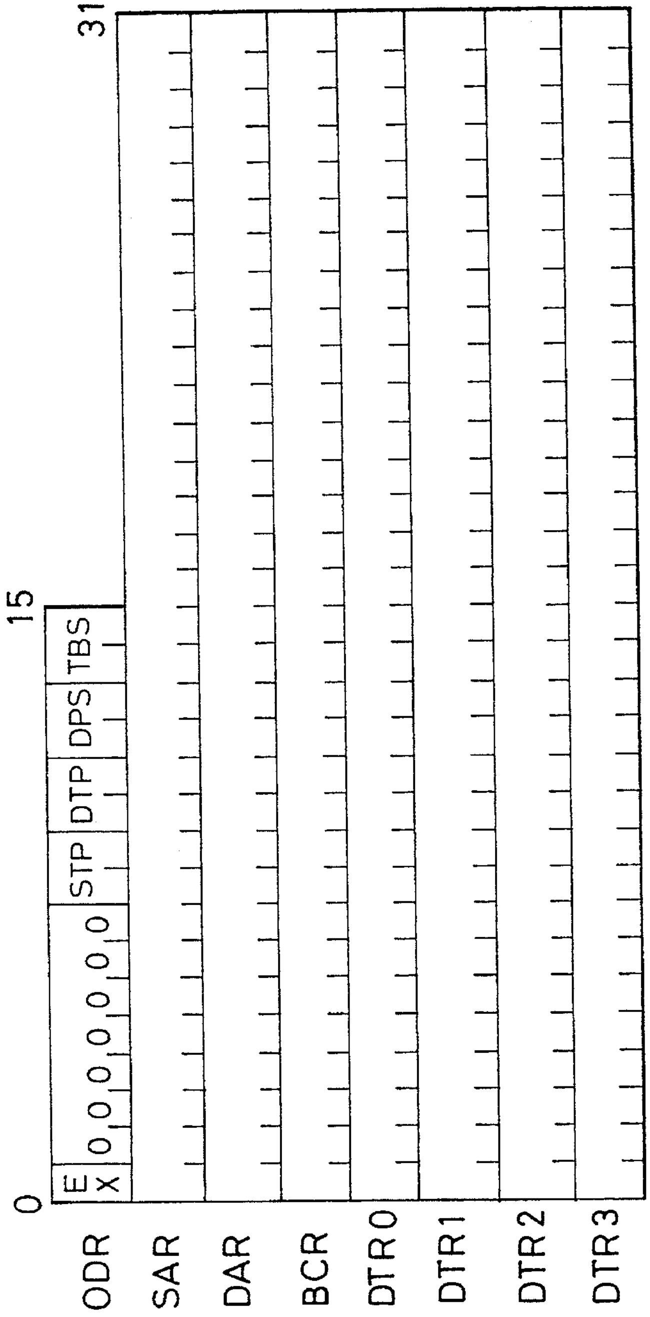
FIG. 3*a* and 3*b* is a view showing the structure of internal registers in the data transfer apparatus according to the present invention.
Figure 3B:
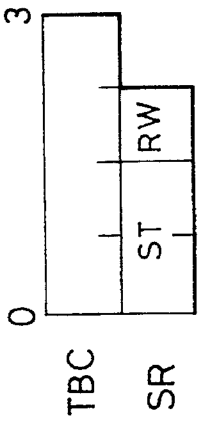

Next, the internal registers in DMA controller 20 will be explained below. The structures of the internal registers are shown in FIG. 3*a*.

Operation defining register ODR prescribes DMA transfer operations. The EX bit indicates the operating condition of channels. In other words, when the EX bit has the value 1, it means that a DMA transfer is under operation. On the other hand, when the EX bit has the value 0, it means that no DMA transfer is under operation. The STP filed shows the type of a source device. When it is 00 and 01, it means that the device is a memory. Especially, when it is 00, it means a high speed transfer mode. On the contrary, when it is 01, it means an ordinary transfer mode (not the high speed transfer mode). When the STP field has the value 10, it means that the device being used is an external I/O device. In this case, only the ordinary transfer mode is used. The DTP field indicates the type of destination devices. When it has the value 00 or 01, the device is a memory. Also, the value 00 means that the transfer under operation is carried out by a high speed transfer mode, while 01 means that the transfer is carried out by an ordinary transfer mode (not the high speed transfer mode). On the other hand, when the DTP field has the value 10, the device is an external I/O device. In this case, the transfer is not carried out by a high speed transfer mode. Only the ordinary transfer mode can be used for the I/O devices. The DPS field indicates the port size of an external I/O device. When the value of DPS field is 00, the port size of the device is one byte. In the same way, 01 indicates two bytes, and 10 indicates four bytes (one word). The TBS field designates the transfer unit in a high speed transfer mode. In fact, when the value of the TBS field is 00, the transfer is carried out in a one word unit. In the same way, 01 means a transfer in a two word unit and 10 means a transfer in a four word unit. When the ordinary transfer mode is selected in both of the STP field and DTP field, the value of the TBS field must be 00.

Byte count register BCR indicates the number of bytes which should be transferred in a DMA transfer. Therefore, this counter decreases its value by the number of transferred bytes in every DMA transfer. When the counter value reaches at 0, the DMA transfer is completed. The value of byte count register BCR should be integral multiples of the byte number of the transfer unit.

Source address register SAR stores the address of a source device which is accessed in a DMA transfer. When a memory is used as the source device, the value of source address register SAR increases by the number of transferred bytes in every DMA transfer. On the contrary, it does not increase when an external I/O device is used as the source device. The value of source address register SAR should be aligned as follows. For instance, when an external I/O device is used as the source device and the DPS field in operation defining register ODR has the value 00, the lower two bits of register SAR can be set arbitrarily. On the other hand, the two bits should be 00 or 10 when the DPS field value is 01. Also, it should be 00 when the DPS field value is 10. When a memory is used as the source device, the source address register value should be aligned in a one word unit. Accordingly, the lower two bits of source address register SAR should be set to 00.

Destination address register DAR stores the address of a destination device which is accessed in a DMA transfer. When a memory is used as the destination device, the register value increases by the transferred byte number in every DMA transfer. On the contrary, if an external I/O device is used as the destination device, the register value does not increase. The register value should also have the alignment described next. For instance, when an external I/O device is used as the destination device and the DPS field of operation defining register ODR has the value 00, the lower two bits of destination address register DAR can be set arbitrarily. On the other hand, the two bits should be set to 00 or 10 when the field value is 01. Also, the two bits should be set to 00 when the field value is 10. When a memory is used as the destination device, the register value should be aligned in a one word unit. Accordingly, the lower two bits of the register should be set to 00.

Data registers DTR0~DTR3 store transfer data. In this embodiment, data registers having a four word capacity are provided. Data registers DTR0~DTR3 are controlled by the following signals which are output from DMA control circuit 22: read signal RD#; write signal WR#; timing signal LTC#; data register selective signals DRS0# and DRS1#; and data register byte control signals DRBC0#~DRBC3#. Read signal RD# becomes active when transfer data are written into internal registers. Write signal WR# becomes active when the transfer data are output. Timing signal LTC# takes a timing for inputting the transfer data into data registers DTR0~DTR3. Data register selective signals DRS0# and DRS1# are used to select one of four data registers DTR0~DTR3. In FIG. 4, the relation between the respective states of data register selective signals DRS0# and DRS1# and data registers selected by these signals. Those data registers DTR0~DTR3 are byte-accessible. Data register byte control signals DRBC0#~DRBC3# show effective bytes among the four bytes in one data register. In fact, signal DRBC0 # show that the 0th~7th bits are effective. In the same way, signal DRBC1#, DRBC2#, or DRBC3# shows that the 8th~15th bits, 16th~23th bits, or 24th~31th bits are effective respectively.

DMA control circuit 22 next controls DMA transfers. This circuit is connected with a processor, I/O devices, and memories outside, via all the external signals except data bus signals D00~D31.

Circuit 22 controls the exchange of bus utility right with the processor by means of bus request signal BREQ# and bus request acknowledge signal BACK#. In addition, circuit 22 controls the execution of bus cycles for a DMA transfer which is requested by an external I/O device through DMA transfer request signal DREQ#.

In order to control the inside operation of DMA controller 20, circuit 22 is connected with each internal register. Circuit 22 is also connected with subtracter 23, and adders 24 and 25 in order to update byte count register BCR, source address register SAR, and destination address register DAR for executing a DMA transfer.

In addition, circuit 22 controls data registers DTR0 ~DTR3, as mentioned above. DMA control circuit 22 includes a transfer data byte count register TBC having four bit capacity, which shows the byte number of transfer data stored in data registers DTR0~DTR3, as shown in FIG. 3*a*. At the beginning of a DMA transfer, transfer data byte count register TBC has the value 0000. Once a DMA transfer has begun, this counter increases its value by the byte numbers taken into internal registers. However, when the TBS field in operation defining register ODR has the value 00, that means the transfer in a one word unit, the higher two bits of register TBC are fixed to 00. In the same way, when the TBC field has the value 01, that means the transfer in a two word unit, the highest bit of register TBC is fixed to 0.

In data byte count register TBC mentioned above, its 0th bit corresponds to signal DRC0# and the first bit corresponds to signal DRS0# respectively. Data register byte control signals DRBC0#~DRBC3# are created by these lower two bits of register TBC and the DPS field value of operation defining register ODR. How those signals DRBC0# ~DRBC3# are created from said values is shown in FIG. 5.

In the case where there is no room to store new data into data registers DTR0~DTR3, that is, when the data register indicated by the TBS field in operation defining register is filled with data, register TBC becomes 0000. Similarly, in the case where there is no data which should be output from data registers DTR0~DTR3, register TBC becomes 0000.

As shown in FIG. 3*a*, DMA control circuit 22 also includes a three bit register SR which designates bus, status. In fact, the ST field of this register SR designates bus status as follows. When the ST field value is 00, it means state Ti. Similarly, 10 means state Ta and 11 means state Td. Such bus states will be described in detail later. In addition, the RW bit shows whether the bus cycle under operation is a read or write bus cycle. For instance, when the bit value is 0, it indicates a read bus cycle, while it indicates a write bus cycle when the value is 1. Register SR, which shows bus status, changes its value according to status of DMA control circuit 22.

As explained above, DMA control circuit 22 has three states, state Ti, state Ta, and state Td. Circuit 22 changes its status as shown in FIG. 6.

Figure 6:
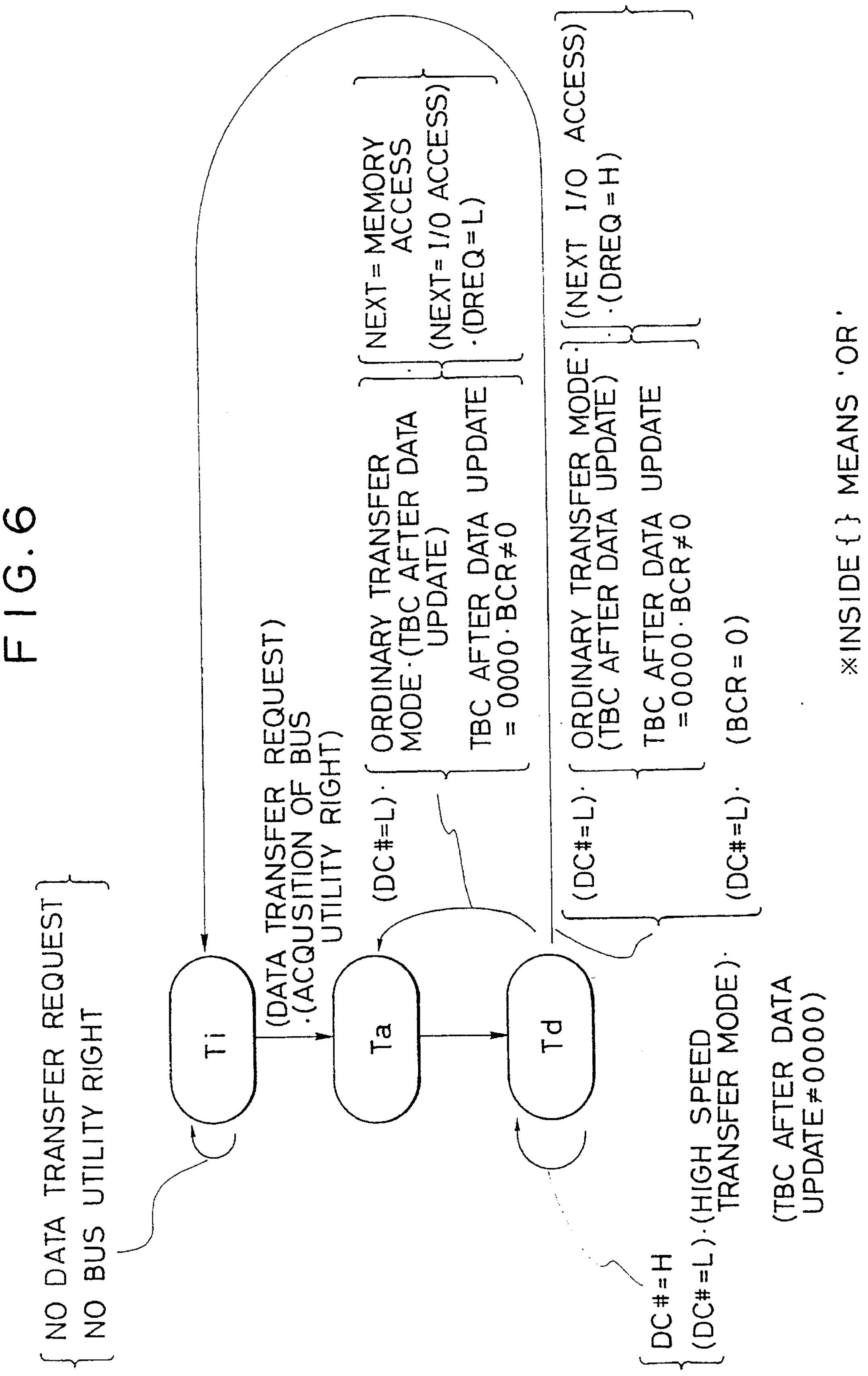
FIG. 6 is a view showing the state transition in the data transfer apparatus of the present invention.

In FIG. 6, state Ti indicates that DMA controller 20 is in an idle state, instead of a bus master state.

State Ta is the beginning cycle in DMA transfer bus cycles. When circuit 22 comes into state Ta, bus start signal BS#, which shows the beginning of bus cycles, is set at level L. And then, if it is a read bus cycle, the value in source address register SAR is output to address bus ABUS. On the other hand, if it is a write bus cycle, the value in destination address register DAR is output to address bus ABUS. At the same time, if it is a read bus cycle, read-write signal R/W# is set at level H, while signal R/W# is set at level L in a write bus cycle. In the case where the DMA transfer is executed in the high speed transfer mode, high speed access request signal BSTREQ# is set at level L. At the falling of clock signal CLK, address strobe signal AS# is set at level L. When one clock of state Ta is completed, state Td begins.

State Td is a data transfer cycle. When state Td has begun, bus start signal BS# is set at level H, and data strobe signal DS# is set at level L. If data transfer end signal DC# is in level L at the falling of clock signal CLK in a read bus cycle, the transfer data on data bus signals D00~D31 should be stored into internal data registers DTR0~DTR3, allowing data strobe signal DS# to change to level H so as to turn into the next status.

On the contrary, in a write bus cycle, the transfer data stored in internal data registers DTR0~DTR3 are output onto data bus signals D00~D31 at the falling of clock signal CLK, which is used for starting state Td. When data transfer end signal DC# is in level L at the falling of clock signal CLK, data strobe signal DS# is set at level H so as to turn into the next status. In both cases, state Td is repeated until data transfer end signal DC# becomes to level L.

In state Ti, the ST field of bus state register SR in DMA control circuit 22 has the value 00. Also, read signal RD# and write signal WR# are both at level H. In the case where the following bus cycle to be executed next is a read bus cycle, the RW bit of bus state register SR will have the value 0. On the contrary, if the following bus cycle to be executed next is a write bus cycle, the RW bit will have the value 1. When a transfer is activated between memories, or when a request of transfer between a memory and an external I/O device is generated from the I/O device, DMA controller 20 acquires a bus utility right from the processor and becomes to a bus master state. Thus, controller 20 turns into state Ta. In this situation, the ST field of bus state register SR has the value 10.

When one clock of state Ta is completed, state Td begins. In this case, the ST field of bus state register will have the value 11.

In state Td, data transfer is executed. As long as data transfer end signal DC# stays at level H during the falling of clock signal CLK, state Td for the same data transfer continues. When the RW bit of bus state register SR has the value 0, a read bus cycle is carried out. In actuality, read signal RD# is set at level L and write signal WR# is set at level H. Then, according to each bit of data transfer byte count register TBC, data register selective signals DRS0# and DRS1#, and data register byte control signals DRBC0#~DRBC3# are output to allow the transfer data to be stored in a certain area of data registers.

The timing to store the data is taken by means of timing signal LTC#. This signal LTC# varies according to the same timing as that of data transfer end signal DC#. Timing signal LTC# comes into level L at the beginning of state Td. The transfer data on data bus signals D00~D31 are stored into data registers at the falling of clock signal CLK in this state Td.

When the RW bit of bus state register SR has the value 1, read signal RD# is set at level H and write signal WR# is set at level L. As a result, the transfer data are output on data bus DBUS. At this time, according to each bit value of data transfer byte count register TBC, data register selective signals DRS0# and DRS1#, and data register byte control signals DRBC0#~DRBC3# are output so as to specify a particular area of data registers. The transfer data stored in this area are, then, output on data bus signals D00~D31.

The values in data transfer byte count register TBC and bus state register vary at a state transition (that is, at the falling of clock signal CLK). Register TBC increases its value by the number of transferred bytes. This number is shown as the DPS field value in operation defining register ODR when an external I/O device is used. On the other hand, the register is increased by four bytes (one word) when a memory is used. The change in bus state register SR will be described later. When data transfer byte count register TBC undergone a change has the value 0000 and the RW bit of bus state register SR before the change has the value 1, it means that all the data stored have already been output. Therefore, in the case where the ordinary transfer mode is selected in the STP and DTP fields of operation defining register ODR, the value of the byte count register is decreased by four using subtracter 23. On the contrary, when the ordinary transfer mode is not selected in both fields, the byte count register value is decreased by the value four times as many as the number of words specified by the TBS field of operation defining register ODR (that is, the number of bytes). In the case where a memory is used as the device, the values of source address register SAR and destination address register DAR are increased by the value four times as many as the number of words specified by the TBS field of operation defining register ODR (that is, the number of bytes), using adders 24 and 25. On the contrary, when an external I/O device is used as the device, the values in registers are not increased.

When data transfer end signal DC# is in level L at the falling of clock signal CLK, the next state will begin at the rising of the next clock signal. In this case, transitions from state Td to another state Td, from state Td to state Ta, and from state Td to state Ti, are possible. Conditions required to cause these transitions will be summarized as follows.

(1) A transition from State Td to Another State Td

This transition takes place to transfer the next one word according to the following conditions: a high speed transfer mode is used; and the value of data transfer byte count register TBC undergone a data update is not equal to 0000. Under these conditions, the high speed transfer is still being executed.

(2) A Transition from State Td to State Ta (2-1) This transition takes place according to the following conditions: an ordinary transfer mode is used; the value of data transfer byte count register TBC undergone a data update is not equal to 0000; and the next access is for a memory, or the next access is for an external I/O device and DMA transfer request signal DREQ# is in level L. In this case, the ST field of bus state register SR is set at 10, while the RW bit is not allowed to change.

(2—2) State Ta takes place after state Td according to the following conditions: the value of data transfer byte count register TBC underdone a data update is equal to 0000; the next access is for a memory, or the next access is for an external I/O device and DMA transfer request signal DREQ# is equal to level L; and the value of byte count register BCR undergone a data update is not equal to 0. In this case, the ST field of bus state register. SR is set at 01 and the RW bit is inverted.

(3) A Transition from State Td to State Ti (3-1) State Ti takes place next, when byte count register BCR is updated to 0. In this case, the ST field of bus state register SR is set at 00 and the RW bit is inverted.

(3-2) State Ti takes place next, according to the following conditions: an ordinary transfer mode is used; the value of data transfer byte count register TBC undergone a data update is not equal to 0000; and the next access is for an external I/O device and DMA transfer request signal DREQ# is equal to level H. In this case, the ST field of bus state register SR is set at 00 while the RW bit is not allowed to change.

(3—3) State Ti takes place next, according to the following conditions: the value of data transfer byte count register TBC undergone a data update is equal to 000; the next access is for an external I/O device and DMA transfer request signal DREQ# is equal to level H; and the value of byte count register undergone a data update is not equal to 0. In this case, the ST field of bus state register SR is set at 0 and the RW bit is inverted.

Whether the next access is for a memory or for an external I/O device is understood from the following: the value of data transfer byte count register TBC undergone a data update; the value of the RW bit of bus state register SR before the data update; and the STP or DTP field value of operation defining register ODR. In the case where the value of data transfer byte count register TBC undergone a data update is 0000, and if the RW bit of bus state register SR before the data update has the value 0, the device which is indicated by the STP field of operation defining register ODR will be accessed next. If the RW bit of bus state register SR before the data update has the value 1 in said case, the device which is indicated by the DTP field of operation defining register ODR will be accessed next. On the other hand, in the case where the value of data transfer byte count register TBC is not equal to 0000, and if the RW bit of bus state register SR has the value 0, the device which is indicated by the STP field of operation defining register ODR will be accessed next. If the RW bit of bus state register SR before the data update has the value 1 in this case, the device which is indicated by the DTP field of operation defining register ODR will be accessed next. The relation described here is summarized in FIG. 7.

The fact, that the value of data transfer byte count register TBC undergone a data update is 0000, implies that if a transfer byte number is added to the register value before the data update, the register value comes into 0000. In the case where an external I/O device is used, the transfer byte number is designated by the DPS field value in operation defining register. On the other hand, if a memory is used, the transfer byte number is one word (four bytes). How the value in data transfer byte count register TBC undergone a data update becomes 0000, is shown in FIG. 8.

Figure 9:
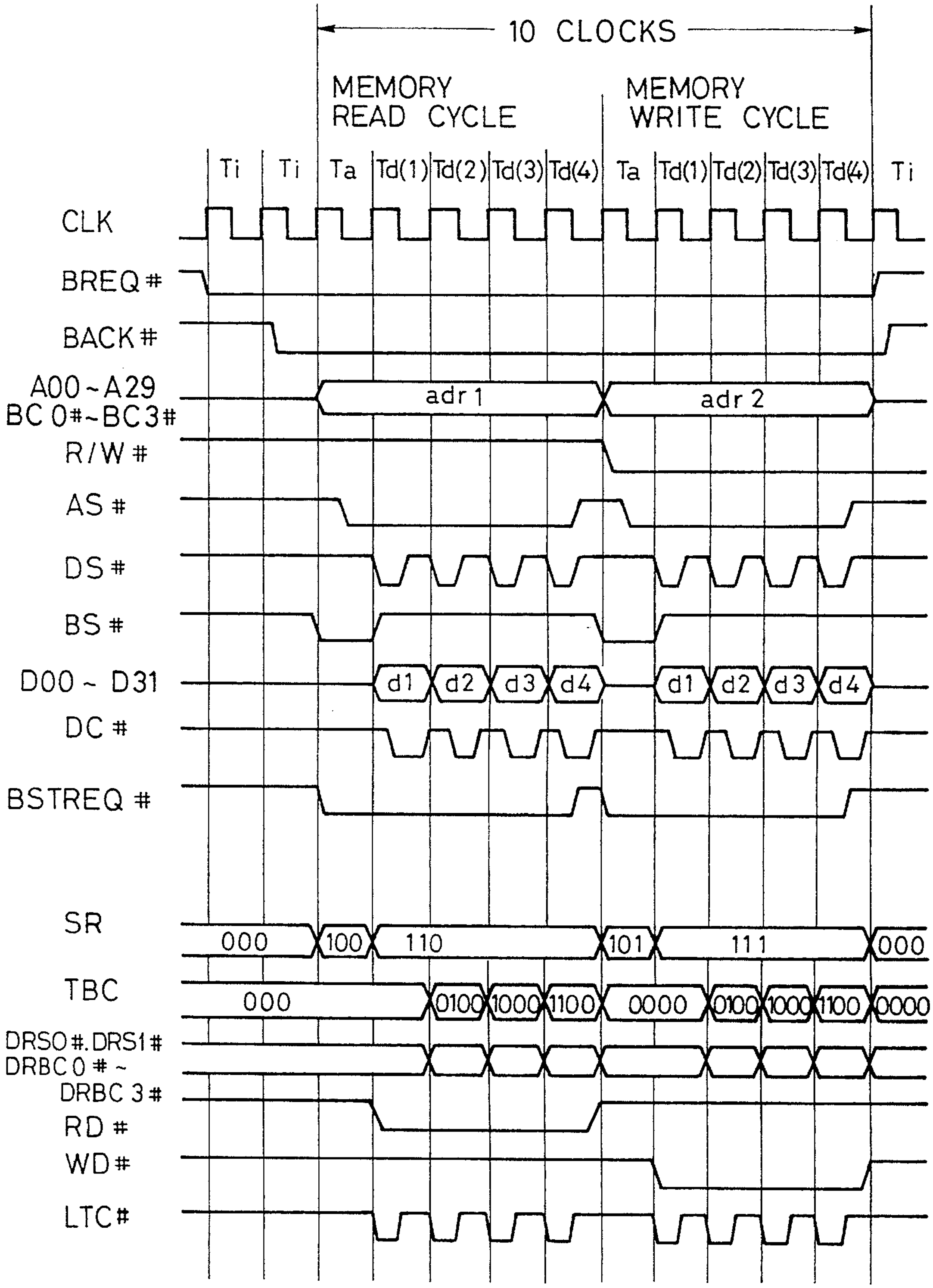
FIG. 9 is a timing chart for transferring four words from a memory to another memory at a high speed by the data transfer apparatus of the present invention.

The operation of the present embodiment will be explained next. A high speed transfer of four words between memories will be described as an example. The timing chart shown in FIG. 9 illustrates waveforms of external and internal signals of DMA controller 20 as well as the operation of internal registers in DMA control circuit 22.

First, in order to execute a data transfer, internal registers in DMA controller 20 are set by the processor. When DMA controller 20 is in the initial state, the ST field of bus state register SR in DMA control circuit 22 has the value 00 and the RW bit has the value 0. Also, data transfer byte count register TBC has the value 0000. Read signal RD#, write signal WR#, and timing signal LTC#, which are the internal signals, are in level H. Therefore, operation defining register ODR, source address register SAR, destination address register DAR, and byte count register BCR should be set.

The STP and DTP fields of operation defining register ODR should be set at 00. The DPS field need not be set because this is a transfer between memories. The TBS field is set at 10 because this is a four word transfer. In source address register SAR, the address of the device, from which data are transferred, is set. In destination address register DAR, the address of the other device, into which the data are transferred, is set. In byte count register BCR, the number of bytes to be transferred, that is, 00000010 (hexadecimal representation), is set. The TBS field of operation defining register ODR has the value 10. This means four words are transferred at a time. Therefore, the value of byte count register BCR should be a multiple of four words (16 bytes).

After setting the internal registers as mentioned above, 1 is written into the EX bit of operation defining register ODR. As a result, DMA controller 20 makes bus request signal BREQ# active to demand the bus utility right of the processor. Then, the processor responds the demand and makes bus request acknowledge signal BACK# active, thus allowing DMA controller 20 to acquire the bus utility right and to turn into state Ta. At this time, the ST field of bus state register SR is set at 10 by activated using the rising of the clock signal CLK which is used to turn into state Ta.

Once DMA controller has turned into state Ta, it starts a read bus cycle. To this end, bus start signal BS# is set at level L, and read-write signal R/W# is set at level H. As a result, the value adr1 in source address register SAR is output on address bus ABUS. Because a high speed transfer mode is used in this case, high speed access request signal BSTREQ# is set at level L. Using the rising of clock signal CLK in state Ta, address strobe signal AS# is set at level L, showing that the output address value adr1 is effective. After the completion of one state Ta clock, DMA controller 20 turns into state Td(1). At the same time, using the rising of clock signal CLK which was used to turn into state Td(1), the ST field of bus state register SR is set at 11.

Once DMA controller has turned into state Td(1), it starts a write bus cycle. To this end, bus start signal BS# is set at level H, and data strobe signal DS# is set at level L. In addition, read signal RD# and timing signal LTC# are set at level L. At the falling of clock signal CLK, data transfer end signal DC# is in level L. Therefore, at the rising of timing signal LTC#, transfer data d1 are stored into the area of the 0th~31th bits in data register DTR0, the area which is designated by data register selective signals DRS0# and DRS1#, and data register byte control signals DRBC0#~DRBC3#. At the same time, data strobe signal DS# is set at level H. As a result, the four bytes of transfer data are stored into data register DTR0. Therefore, in order to turn into the next state at the rising of clock signal CLK, transfer byte count register TBC should be increased by four to become 0100. Because the high speed transfer mode is used in this case and the value of register TBC, which has undergone a data update, is not equal to 0000 , DMA controller 20 turns into state Td(2) next.

In state Td(2), transfer data d2 are stored into the 0th~31th bits of data register DTR1, by having undergone the same operation as that of state Td(1). In the following state Td(3), transfer data d3 are stored into the 0th~31th bits of data register DTR2. Further, in state Td(4), transfer data d4 are stored into the 0th~31th bits of data register DTR3.

At state Td(4), the value of data transfer byte count register TBC is 1100. If this value is updated, it becomes 0000 . This means that the register TBC value will be 0000 after the data update. At the same time, the RW bit of bus state register SR has the value 0. this fact means that the high speed transfer mode is being used. As a result, DMA controller 20 should turn into state Ta next. At the falling of clock signal CLK in state Td(4), address strobe signal AS# and high speed access request signal BSTREQ# are set at level H. Also, at the rising of clock signal CLK, which is used to turn into state Ta, the ST field of bus state register SR comes into 10, the RW bit comes into 1, and data transfer byte count register TBC comes into 0000.

In state Ta, bus start signal BS# and read-write signal RW# are set at level L. Thus, the value adr2 in destination address register DAR is output on address bus ABUS. On the other hand, high speed access request signal BSTREQ# is set at level L. Address strobe signal AS# is set at level L at the falling of clock signal CLK. After having completed one clock of state Ta, DMA controller 20 turns into state Td(1). At the transition from state Ta to state Td(1), that is, at the rising of clock signal CLK, the ST field of bus state register SR is set at 1.

In state Td(1), bus start signal BS# is set at level H, and data strobe signal DS# is set at level L. In addition, write signal WR# is set at level L so as to output transfer data d1 onto data bus DBUS. These transfer data d1 have been stored in the area of the 0th~31th bits in data register DTR0, the area which is designated by data register selective signals DRS0# and DRS1#, and data register byte control signals DRBC0~DRBC3#. At the falling of clock signal CLK, data transfer end signal DC# is in level L. Thus, DMA controller 20 sets data strobe signal DS# at level H, and turns into the next state. Because four bytes of transfer data have been output during state Td(1), the value of transfer data byte count register TBC is increased by four to become 0100 at the rising of clock signal CLK, so as to transfer to the next state. In this situation, a high speed transfer mode is used and the value of updated register TBR is not equal to 0000 . Therefore, the next is state Td(2).

In state Td(2), DMA controller 20 executes the same operation as that of state Td(1), in order to output transfer data d1 which have been stored in the 0~31 bits of data register DTR1. In the following state Td(3), transfer data d3, which have been stored in the 0th~31th bits of data register DTR2, are output. Further, in state Td(4), transfer data d4, which have been stored in the 0th~31th bits of data register DTR3, are output.

At state Td(4), the value of data transfer byte count register TBC is 1100. If the number of transfer bytes (four bytes) is added to the value 1100, it becomes 0000 . This means that the value of register TBC will be equal to 0000 after the data update. In addition, a high transfer mode is used in this case and the RW bit of bus state register SR has the value 1. Thus, address strobe signal AS#, high speed access request signal BSTREQ#, and read-write signal R/W# are set at level H at the failing of clock signal CLK.

At the rising of clock signal CLK which is used to turn into the next state, the values of bus state register SR, data transfer byte count register TBC, source address register SAR, destination address register DAR, and byte count register BCR are updated. In actuality, register TBC comes into 0000 . Also, both registers SAR and DAR increase their values by the number of transferred bytes, that is, 16 bytes, because it is a transfer between memories. On the contrary, register BCR decreases its value by the number of transferred bytes, that is, 16 bytes. Thus, the value of byte count register BCR comes into 0000 0000 (hexadecimal representation) to complete the data transfer. DMA controller 20, then, sets bus request signal BREQ# to be level H, in order to relinquish the bus utility right. Controller 20 turns into state Ti next. At the same time, the ST field of bus state register SR comes into 00 and the RW bit comes into 0.

Figure 13:
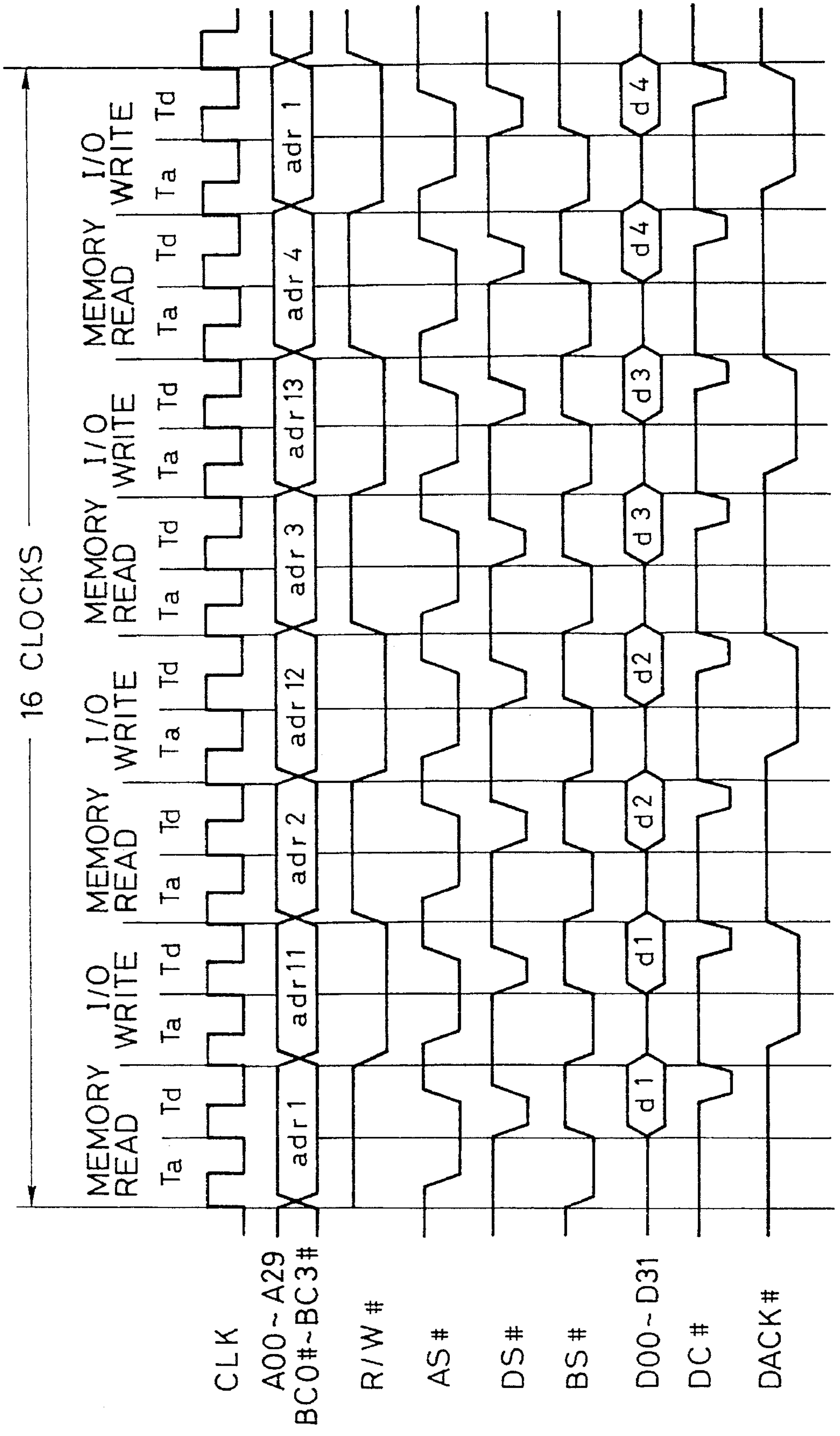
FIG. 13 is a timing chart for transferring four words from a memory to an external I/O device by the prior art data transfer apparatus.

In this embodiment, as illustrated above, the high speed transfer mode is used to transfer data from a memory to another memory. This mode is, of course, used in both of data readings and data writings. As compared with the prior art DMA controller 50 (shown in FIG. 13) which requires 16 clocks to transfer data, the DMA controller of this embodiment only requires 10 clocks. As a result, DMA controller 20 of this embodiment can save 6 clocks (16–10 =6) to carry out a data transfer.

Figure 10:
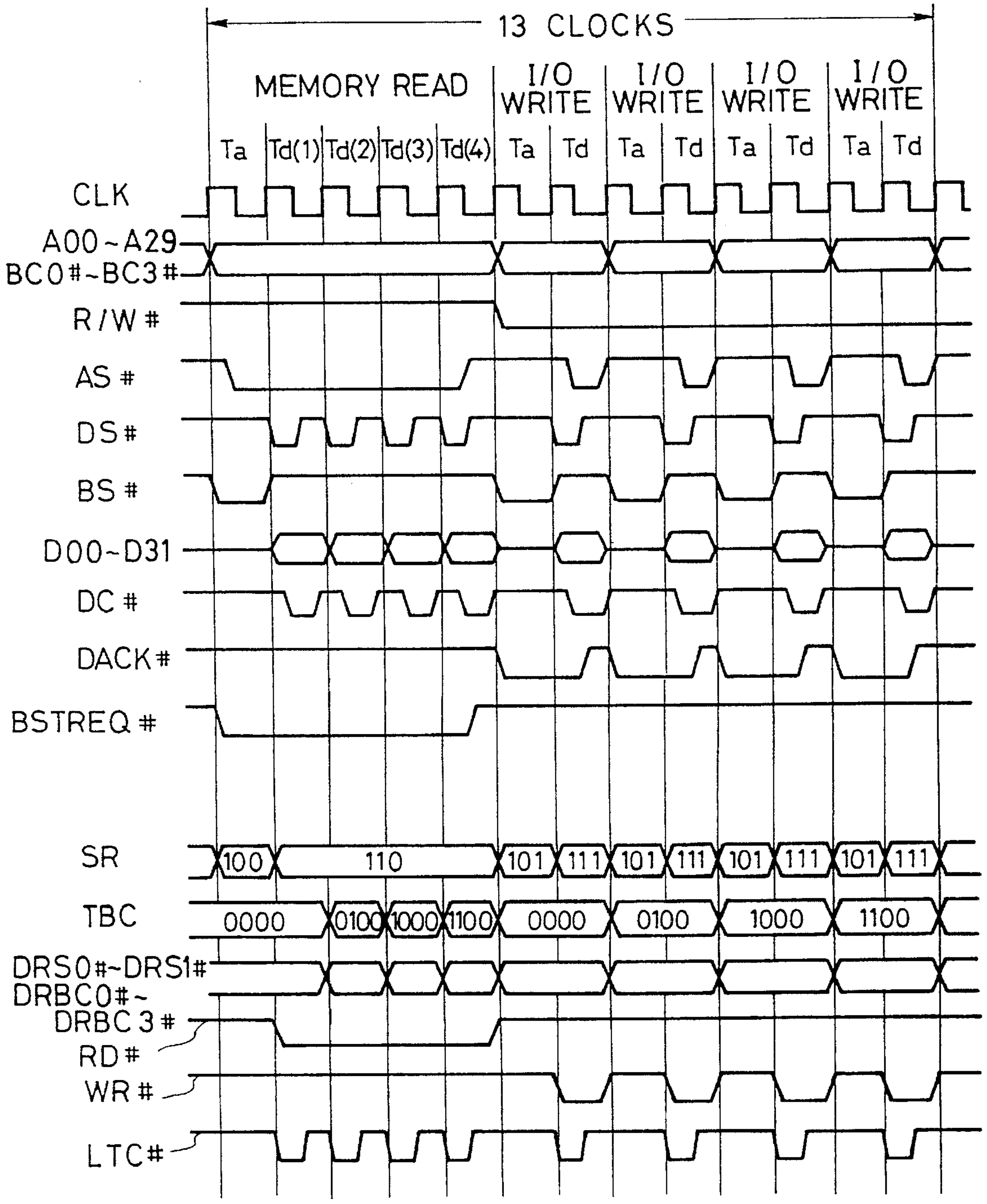
FIG. 10 is a timing chart for transferring four words from a memory to an external I/O device by the data transfer apparatus of the present invention.

Next, another example for explaining the operation of this embodiment will be shown. This example is concerned with a data transfer from a memory to an external I/O device. FIG. 10 shows timing views of external and internal signals of DMA controller 20, including the operation of internal registers in DMA control circuit 22.

When data are transferred using the high speed transfer mode in this case, by the similar way as that of the previous example, four words of data can be stored into data registers DTR0~DTR3 by five clocks. In this case, the change of bus state is as follows: Ta–Td(1)–Td(2)–Td(3)–Td(4).

In the next stage, the transfer data stored in data registers DTR0~DTR3 are output to the external I/O device. In this case, the high speed transfer mode cannot be used. Therefore, the cycle Ta–Td should be repeated four times. 8 clocks are required, therefore, to transfer four words of data.

As a result, the total of 13 clocks are required to transfer data from the memory to the I/O device. As compared with DMA controller 50 of the prior art, 3 clocks (16–13=3) can be saved in this case.

In this embodiment, the DMA controller having only one channel has been explained. However, DMA controller 20 can be easily expanded to a multi-channel controller which is, indeed, included in this invention.

Also, in this embodiment, the number n of internal data registers DTRn has been taken as 4 corresponding to four word data. However, 8, 16, and so on can be taken as the number of n. In these cases, the number of data register selective signals DRSm# may be changed according to the number of internal data registers DTRn. The number of words, which are transferred at a time in the high speed transfer mode, is not always required to be fixed to two or four words. When another number is used, the number of data registers DTRn and the bit number of data transfer byte count register TBC may be increased.

Further, addresses are fixed in this embodiment during the operation of the high speed transfer mode. However, other access methods can be taken. For example, only lower bits may be changed to access while higher bits are fixed. In the case where internal registers have four word capacity, the lower two bits (A28, A29) of an address may be changed as (0, 0), (0, 1), (1, 0), and (1, 1). In this case, the number of lower bits, which should be changed, varies according to the number of words which are continuously accessed.

In summary, the data transfer apparatus of the present invention stores a plurality of words continuously into internal register files by accessing to one of the external devices, between which multi-word data should be transferred at a time. The apparatus, then, accesses to the other device and continuously transfers data, which have been stored in the register files, into the device. Thus, the apparatus can transfer multi-word data at a time. For a memory, in which a high speed access mode, for example, a paged mode, can be used, the apparatus of the present invention can transfer data using the high speed transfer mode of the memory, thus allowing to transfer a series of data including a plurality of words at a time. So, the present invention provides the data transfer apparatus which is capable of transferring data at a high speed.

In addition, the data transfer apparatus of the present invention control the input and output of transfer data into or from register files, according to the values stored in counting means. The apparatus also determines the next state to turn into, according to informations held in operation defining means, state holding means, and the counting means. As a result, the apparatus can easily control the complicated state transitions, and can also set arbitrarily, by programmings, of the number of words contained in a transfer unit of a high speed transfer. So, the present invention provides the data transfer apparatus in which multi-word data can be transferred in an arbitrary unit at a high speed.

What is claimed is:

1. A data transfer apparatus for transferring data of at least one word using a DMA (direct memory access) transfer between external devices, comprising:

a data bus;

a DMA controller to control direct memory access using said data bus;

a DMA control circuit for controlling a data transfer between said devices after having acquired a bus utility right from a processor;

a plurality of data registers, in said DMA controller, for storing multi-word data to be transferred to one of said devices based on instructions from said DMA control circuit;

an operation defining register for storing the source device type among said devices, the destination device type among said devices, and the transfer unit used to transfer multi-word data;

a source address register for storing the address of a source device;

a destination address register for storing the address of a destination device;

a byte count register for storing the number of transferred bytes in a DMA transfer;

a subtracter to decrease the value in said byte count register for every DMA transfer according to the control by said DMA control circuit; and at least two adders to increase the values in said source address register and said destination address register for every DMA transfer according to the control by said DMA control circuit.

2. The data transfer apparatus as claimed in claim 1, wherein said DMA control circuit includes a three-bit bus state register in which a first bus access state to output the addresses of said external devices accessed by the present data transfer apparatus, a second bus access state to transfer data corresponding to one word, and a third bus access state to indicate that the present data transfer apparatus is in an idle state, are stored, and further includes a data transfer byte count register for counting the byte number of data stored in said data registers.

3. The data transfer apparatus as claimed in claim 2, wherein said DMA control circuit determines the next state to change according to informations stored in said operation defining register, bus state register, and data transfer byte count register.

4. A data transfer apparatus for transferring data from a source storage to a destination storage in accordance with a direct memory access technique, comprising:

a data bus;

a DMA controller to control direct memory access using said data bus;

a source address register for holding a first starting address of data stored in said source storage to be transferred to said destination storage;

a destination address register for holding a second starting address of said destination storage for receiving the data;

a byte count register for storing the number of bytes of the data to be transferred;

a plurality of data registers, in said DMA controller, for temporarily storing the bytes of the data successively transferred to said source storage; and a control circuit connected to said source address register, said destination address register, said byte count register and said plurality of data registers for controlling the direct memory access.

5. A data transfer apparatus as claimed in claim 4, further comprising an operation defining register for storing a source device type, a destination device type, and a transfer unit identification.

6. A data transfer apparatus as claimed in claim 4, wherein the number of said data registers is at least four.

7. A data transfer apparatus as claimed in claim 4, further comprising an operation defining register containing a field indicating a port size of an external I/O device.

8. A data transfer apparatus for transferring data from a first memory location to a second memory location through a data bus having a bus width in accordance with a direct memory access technique, comprising:

storage means for storing a plurality of data items each of which has a data length equal to the bus width of said data bus; and DMA transfer control means for transferring said data items from said first memory location to said second memory location in a high speed transfer mode in which a plurality of the data items are transferred from said first memory location to said second memory location within one memory read cycle and one memory write cycle.

* * * * *